United States Patent
Sharp et al.

(10) Patent No.: US 10,059,341 B2
(45) Date of Patent: Aug. 28, 2018

(54) CONTROL STRATEGY FOR REDUCED FUEL CONSUMPTION IN MACHINE AND POWERTRAIN SYSTEM WITH SAME

(71) Applicant: Caterpillar Inc., Peoria, IL (US)

(72) Inventors: Jeremy Sharp, Washington, IL (US); Suman Goli, Edwards, IL (US); Mark Rettig, East Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 176 days.

(21) Appl. No.: 15/185,665

(22) Filed: Jun. 17, 2016

(65) Prior Publication Data

US 2017/0361845 A1 Dec. 21, 2017

(51) Int. Cl.
| | |
|---|---|
| *B60W 10/06* | (2006.01) |
| *B60W 30/188* | (2012.01) |
| *B60W 10/10* | (2012.01) |
| *B60W 30/182* | (2012.01) |
| *E02F 9/20* | (2006.01) |

(Continued)

(52) U.S. Cl.
CPC ........ *B60W 30/1882* (2013.01); *B60W 10/06* (2013.01); *B60W 10/10* (2013.01); *B60W 30/182* (2013.01); *E02F 9/2066* (2013.01); *E02F 9/2079* (2013.01); *F15B 11/08* (2013.01); *B60W 10/103* (2013.01); *B60W 2510/0638* (2013.01); *B60W 2510/0657* (2013.01); *B60W 2510/1005* (2013.01); *B60W 2520/10* (2013.01); *B60W 2530/00* (2013.01); *B60W 2540/10* (2013.01); *B60W 2710/0644* (2013.01); *B60W 2710/105* (2013.01); *Y10T 477/679* (2015.01); *Y10T 477/68* (2015.01)

(58) Field of Classification Search
CPC .. Y10T 477/679; Y10T 477/68; E02F 9/2079; E02F 9/2066; B60W 10/103; B60W 2510/0638; B60W 2510/1005; B60W 2540/10; B60W 2510/0657; B60W 30/1882; B60W 10/06; B60W 30/182; B60W 2710/105; B60W 2710/0644; B60W 2520/10
USPC ..................................... 701/50, 65
See application file for complete search history.

(56) References Cited

U.S. PATENT DOCUMENTS

| | | | | |
|---|---|---|---|---|
| 5,413,540 | A | * | 5/1995 | Streib .................. B60W 10/06 477/43 |
| 6,819,985 | B2 | | 11/2004 | Minagawa |
| 7,472,008 | B2 | | 12/2008 | Betz |

(Continued)

FOREIGN PATENT DOCUMENTS

EP 2413005 1/2012

OTHER PUBLICATIONS

Not published U.S. Appl. No. 14/867,647 of Suman Goli for "Transmission System Having Efficiency-Based Speed Control" filed Sep. 28, 2015.

*Primary Examiner* — Roger L Pang
(74) *Attorney, Agent, or Firm* — Mattingly Burke Cohen & Biederman

(57) ABSTRACT

A control system for a powertrain system includes an electronic control unit structured to receive ground speed data and load factor data. The electronic control unit determines an engine speed command to an engine and a torque command to a variable-torque transmission based upon an engine speed limit and a torque scale factor that can vary with ground speed and load factor. The commands produce an economy output of the powertrain to reduce fuel consumption.

10 Claims, 5 Drawing Sheets

(51) Int. Cl.
*F15B 11/08* (2006.01)
*B60W 10/103* (2012.01)

(56) References Cited

U.S. PATENT DOCUMENTS

| | | |
|---|---|---|
| 7,962,768 B2 | 6/2011 | Grill |
| 8,761,977 B2 | 6/2014 | Chan |
| 8,768,582 B2 | 7/2014 | Toda |
| 8,788,156 B2 | 7/2014 | Nishimura |
| 9,227,525 B2 | 1/2016 | Fleege |
| 9,656,656 B2 * | 5/2017 | Xing .................... B60W 10/06 |
| 9,689,319 B2 * | 6/2017 | Hoff ...................... F02D 11/105 |
| 2013/0006456 A1 | 1/2013 | Thaduvayi |
| 2014/0058649 A1 | 2/2014 | Miyasaka |
| 2014/0257669 A1 * | 9/2014 | Wu ....................... B60W 10/06 |
| | | 701/102 |
| 2015/0082779 A1 | 3/2015 | Shirao |
| 2015/0204053 A1 | 7/2015 | Imaizumi |
| 2015/0315766 A1 | 11/2015 | Take |
| 2017/0361842 A1 * | 12/2017 | Livshiz ............... B60W 30/188 |

\* cited by examiner

US 10,059,341 B2

CONTROL STRATEGY FOR REDUCED FUEL CONSUMPTION IN MACHINE AND POWERTRAIN SYSTEM WITH SAME

TECHNICAL FIELD

The present disclosure relates generally to control strategies for reducing fuel consumption, and relates more particularly to limiting powertrain output in a manner that varies based upon ground speed and engine load in a machine.

BACKGROUND

Engineers are always seeking ways to improve the efficiency and productivity of machines and systems. Reducing energy costs through improved efficiency of a mine, quarry, aggregate, forestry or construction operation, for example, and increasing predictability of such costs, are perennial goals of engineers, site managers and machine operators. In the context of fuel economy, virtually innumerable strategies have been developed over the years to enable machines and systems to operate on less fuel. High fuel costs and volatility in energy markets have increased incentives in recent years for improvements in this field.

Engine operating strategies have been proposed, for example, where fuel is injected at a time or according to a manner of injection such that the fuel will be burned as completely as possible. Other strategies limit operation of an engine or machine more directly, such as by placing limits on engine speed or engine torque. In either case, a tradeoff in performance is commonly observed.

Commonly owned U.S. Pat. No. 7,962,758 to Grill et al. is directed to a Machine System Having Task-Adjusted Economy Modes. Grill et al. propose a control system having a controller that classifies a currently performed task, and adjusts power source operation based upon the classification.

SUMMARY

In one aspect, a control system for a powertrain in a machine includes a first sensing mechanism structured to monitor a ground speed of the machine, and a second sensing mechanism structured to monitor an engine load of an engine in the powertrain. The control system further includes an electronic control unit structured to output an engine speed command for an engine in the powertrain and a torque command for a torque control mechanism of a variable-torque transmission in the powertrain. The electronic control unit is in communication with each of the first sensing mechanism, the second sensing mechanism, and the input device, and is structured to determine each of the engine speed command and the torque command based on at least one of the ground speed and the engine load, to produce an economy powertrain output less than the requested powertrain output.

In another aspect, a powertrain system for a machine includes an engine, and a variable-torque transmission coupled with the engine and including a torque control mechanism structured to vary an output torque produced by the transmission. The system further includes an input device structured to produce an input signal indicative of a requested powertrain output, a first sensing mechanism structured to monitor a ground speed of the machine, a second sensing mechanism structured to monitor an engine load of the engine, and an electronic control unit. The electronic control unit is in communication with each of the first sensing mechanism and the second sensing mechanism. The electronic control unit is structured to determine each of an engine speed command for the engine and a torque command for the torque control mechanism based on at least one of the ground speed and the engine load, and to produce an economy powertrain output that is reduced from the requested powertrain output to an extent that is dependent upon the ground speed and the engine load.

In still another aspect, a method of operating a machine includes a powertrain having an engine and a variable-torque transmission. The method includes receiving a first input signal requesting a first output of the powertrain, during operating the machine according to a first combination of ground speed and engine load, and commanding an engine speed and a transmission torque to operate the powertrain at a first economy output that is reduced to a relatively greater extent from the requested first output. The method further includes receiving a second input signal requesting a second output of the powertrain, during operating the machine according to a second combination of ground speed and engine load, and commanding an engine speed and a transmission torque to operate the powertrain at a second economy output that is reduced to a relatively lesser extent from the requested second output.

DETAILED DESCRIPTION

Figure 1:
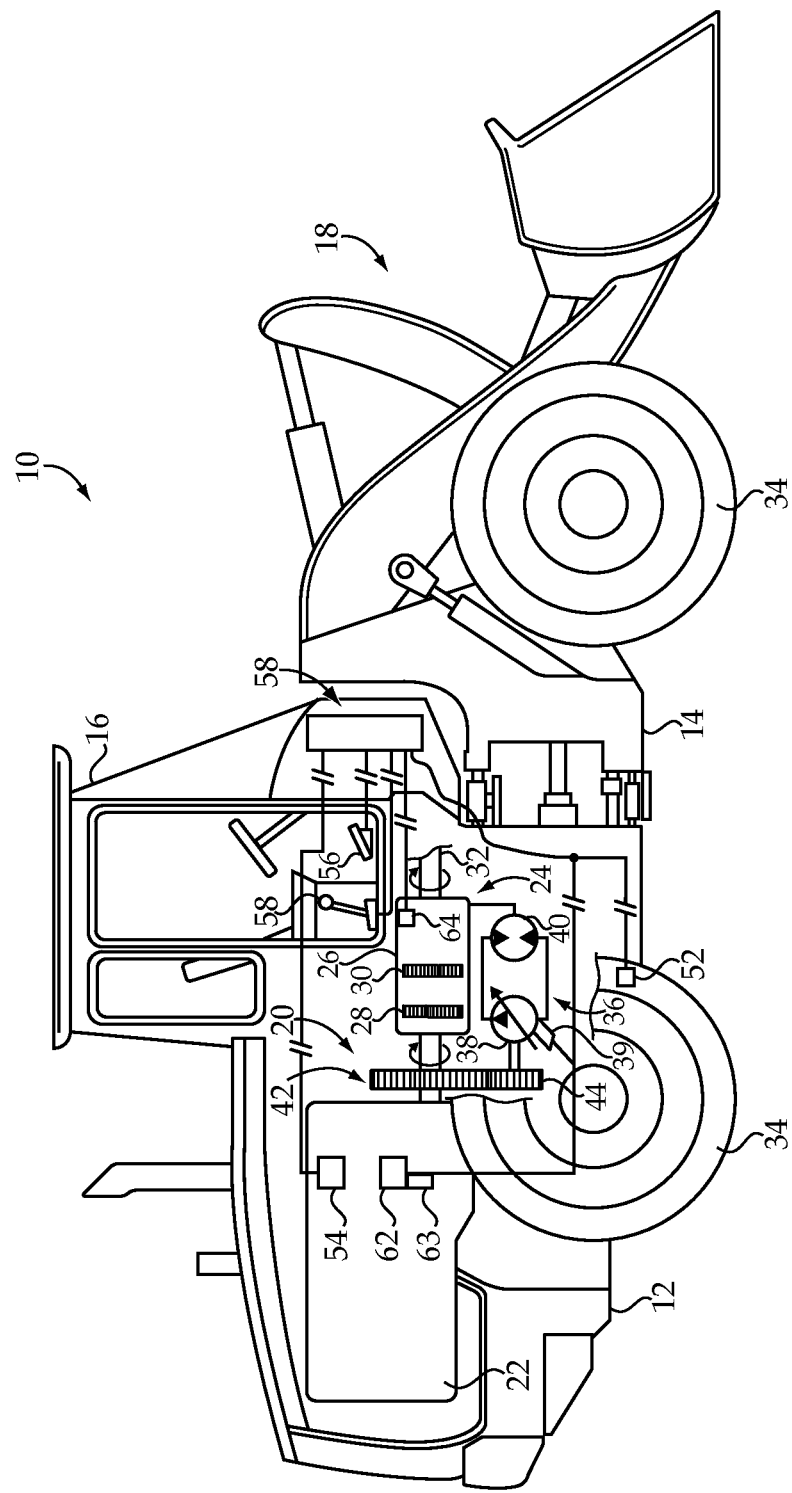
FIG. 1 is a side diagrammatic view of a machine having a powertrain system, according to one embodiment.

Referring to FIG. 1, there is shown a machine 10 according to one embodiment. Machine 10 includes a back frame unit 12 and a front frame unit 14 structured to articulate relative to front frame unit 14, and an operator cab 16 mounted to back frame unit 12. An implement system 18 is coupled with front frame unit 14. A powertrain system 20 provides traction power to a plurality of ground-engaging elements 34 in the nature of ground engaging wheels. Machine 10 is shown in the context of a wheel loader of the type used, for example, for capturing and dumping loose material in mining, agriculture, aggregate, landfill, construction, and still other industries. A control system 50 for powertrain system 20 is provided for the purposes of controlling power provided to ground-engaging elements 34, in particular for operating powertrain system 20 in a plurality of different modes as further discussed herein. Rather than a wheel loader application, in other instances machine 10 might be of a different design. Track loaders, certain track-type or wheel tractors, off-highway trucks, and a variety of other machine types could benefit from the teachings set forth herein.

In a practical implementation strategy powertrain system 20 (or "powertrain 20") includes an engine 22, such as a compression ignition internal combustion engine, coupled with a transmission system 24. An engine throttle 62 is provided that is structured to control a flow of fuel to engine 22, and includes a throttle actuator 63. Transmission system 24 may include a first transmission that includes a mechanical transmission 26 having a plurality of gears 28 and 30, and a torque control mechanism 36. Transmission 26 may include an output shaft 32 that rotates to provide a transmission output torque. A mechanical power transmission path including gears 28 and 30 is provided by transmission 26. Mechanism 36 may further apply a torque to transmission 26, which torque can be applied to output shaft 32, internally to gears 28 and 30, to an input shaft (not numbered), or otherwise by any suitable means. Transmission 26 may include a variable-torque transmission such that a direct mechanical coupling from engine 22 applies torque to output shaft 32 via the mechanical power transmission path, and a non-mechanical power transmission path formed in part by mechanism 36 also applies torque to output shaft 32. In such an embodiment, transmission 26 can be understood to provide a hybrid transmission. A variety of different hybrid transmission types are contemplated within the context of the present disclosure. In the illustrated embodiment, mechanism 36 includes a hydraulic variator having a pump 38 and a motor 40. Pump 38 may be driven by way of a pump gear 44 coupled with a geartrain 42 of engine 22. In other embodiments pump 38 might be electrically driven, for instance. Motor 40 may be structured to apply torque to transmission 26 so as to vary a torque of output shaft 32 by way of any suitable configuration, and various designs are well known and widely used. Rather than a hydro-mechanical hybrid transmission, in other instances an electromechanical hybrid transmission might be used. Further, rather than a hybrid transmission embodiments are contemplated where a hydrostatic transmission by itself could be used. The present disclosure is not limited to any particular transmission type, although as further discussed herein in practical implementations the torque output of transmission system 24 will be variable.

In an embodiment, mechanism 36 may comprise an example of a torque control mechanism for powertrain 20 that is structured to vary the output torque of output shaft 32. Pump 38 may have a variable displacement, and includes an actuator 39 that can vary pump displacement so as to vary the manner in which mechanism 36 interacts with transmission 26, such as by varying a magnitude of torque that is applied and blended with the torque of the direct mechanical coupling between engine 22 and output shaft 32. In an electromechanical hybrid system, for example, an electric motor torque applied to be blended with direct mechanical torque from the engine could be varied to analogous effect. Numerous other combinations of hydraulic components, mechanical components, and electrical components can be combined to various ends in a powertrain system in view of the teachings set forth herein.

As noted above, a control system 50 is provided for controlling the operation of powertrain 20. Control system 50 may include a first sensing mechanism 52 structured to monitor a ground speed of machine 10. First sensing mechanism 52 could be a wheel rotation sensor, ground-sensing radar, a driveline speed sensor, a global or local positioning system sensor(s) structured to receive satellite signals, or any other suitable mechanism or group of mechanisms for directly or indirectly determining a ground speed of machine 10. Control system 50 may further include a second sensing mechanism 54 structured to monitor an engine load of engine 22. In the illustrated embodiment, sensing mechanism 54 is depicted as an individual unit. It will be appreciated, however, that multiple different individual sensors may be used to determine engine load in a known manner. Accordingly, a sensing mechanism can include multiple different sensors. A first input device 56 may be positioned within operator cab 16, and may include an accelerator pedal, for instance. Input device 56 could also include a control lever or joystick, a touchscreen, buttons, or any other conceivable instrument that can be manipulated by an operator. Input device 56 produces an operator input signal indicative of a requested powertrain output. In a practical implementation strategy, input device 56 could be depressed part-way to request one-half of a theoretically available powertrain output, and depressed all of the way to the floor to request a full powertrain output. As used herein, the term powertrain output can be understood to mean a power output applied to output shaft 32. Accordingly, with input device 56 depressed all the way an operator could be requesting 100% of the power output theoretically available from output shaft 32, including torques blended from one of gears 28 and 30 and from mechanism 36. As will be further apparent from the following description, control system 50 is structured to leverage the capability to control and limit both engine speed and transmission torque responsive to monitored operating state(s) of machine 10 to enable reduced fuel consumption in an economy mode without unduly affecting performance. In general terms, the economy mode delivers powertrain outputs that will be less than what an operator is requesting, at least some of the time. The present strategy can limit powertrain output selectively, however, and with various built-in exceptions or modulations to the limits on powertrain output so that under certain conditions the powertrain output will be closer to or equal to what the operator is requesting, and under others further from what is requested. An operator, or a vehicle controller for instance, can selectively switch from a full-performance mode to an economy mode by operating a second operator input device in the nature of a switch or the like 58 positioned in operator cab 16. Operator cab 16 can also be equipped with various other mechanisms for controlling and operating machine 10, including a gear shift, a steering wheel, additional foot pedals, and implement system controls.

As indicated above, control system 50 is structured to provide a powertrain output that can vary depending upon what mode machine 10 is operated in. To this end, control system 50 includes an electronic control unit 60 structured to output an engine speed command for engine 22 and a torque command for mechanism 36. It should be appreciated that the term electronic control unit is not to be taken to mean that a single processor or computing device, or even a single physical control module or the like is required. Controller system 50 might include multiple separate and individual processors working cooperatively to produce an engine speed command and a torque command. In a practical implementation strategy, the engine speed command and the throttle command can each prompt the generation of an electrical signal such as electrical currents, to electrical actuator 63 coupled with throttle 62 and to electrical actuator 39 of pump 38. Actuator 63 can position throttle 62 in a prescribed manner to produce a desired engine speed. Actuator 39 can position a swash plate or the like (not shown) in pump 38 to produce a desired pump displacement.

Electronic control unit 60 is further in communication with each of sensing mechanisms 52 and 54, and structured to determine each of the engine speed command and the torque command based on at least one of the ground speed and the engine load, to produce an economy powertrain output less than the requested powertrain output. It will be appreciated that the ground speed and engine load acted upon by electronic control unit 60 can be observed or apparent ground speed and observed or apparent engine load, as sensing mechanisms 52 and 54 will typically have some error even if minor. As noted above, the extent to which a commanded powertrain output departs from an operator requested output, at least when operating in an economy mode, can vary depending upon machine state. The subject machine state can be a combination of ground speed and engine load. Electronic control unit 60 may thus further be structured to produce an economy powertrain output that is reduced from a requested powertrain output to an extent that is dependent upon the ground speed and engine load. Practical implementations of this general principle are further set forth below.

Figure 2A:
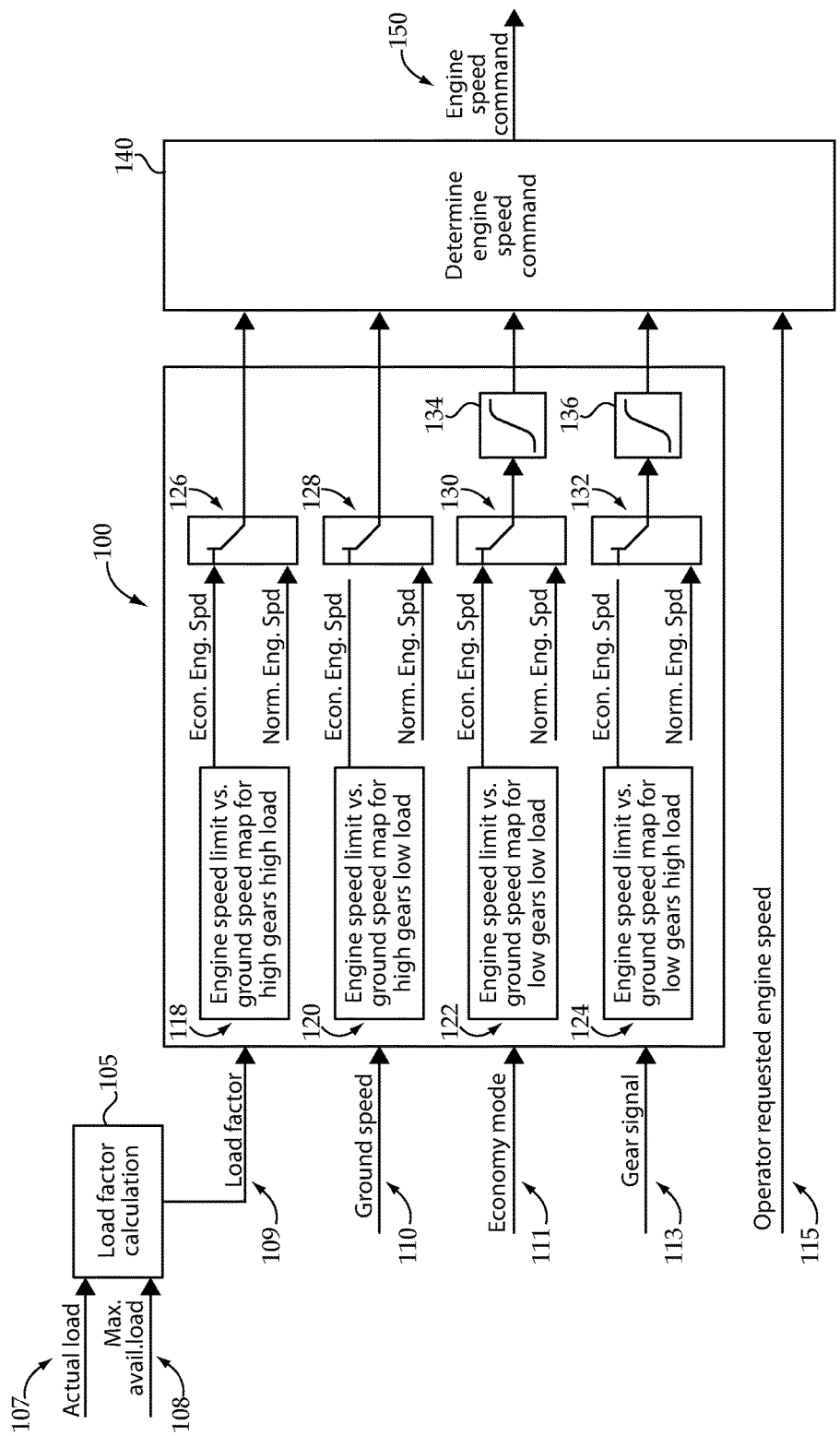
FIG. 2a is a functional block diagram of control system features and functions, according to one embodiment.

Referring now also to FIG. 2a, there is shown a functional block diagram including an engine speed command determination 100. Certain of the determinations made by electronic control unit 60 are upon the basis of engine load. At 105, an actual or measured load 107 and a maximum available load (Max. Avail. Load) 108 are used in a load factor calculation to determine a load factor 109. The load factor 109 is one of a plurality of inputs used in determining an engine speed command 150, including a ground speed input 110, a gear signal input 113, such as from a gear sensor 64 shown in FIG. 1, that indicates a present transmission gear, and an economy mode input 111. The economy mode input 111 can be a command signal from device 58 or present state of device 58, for instance, that activates or maintains economy mode. An operator requested engine speed is shown at 115.

In a practical implementation strategy, electronic control unit 60 is structured to determine an engine speed limit that is dependent upon the ground speed and the engine load, and to determine the engine speed command based upon the engine speed limit in an economy mode, namely, a fuel economy mode, where the operator requested engine speed exceeds the determined engine speed limit. In other words, the engine speed actually produced can be what the operator is requesting so long as the determined engine speed limit is not exceeded, in which case the engine speed actually produced will be the limit speed. It will be appreciated that electronic control unit 60 is further structured to determine another engine speed command that produces an operator requested engine speed and provides a full requested powertrain output. In a further practical implementation strategy, electronic control unit 60 is further structured to determine a plurality of different engine speed limits that are based upon ground speed and engine load. The plurality of engine speed limits may be determined from a plurality of different stored maps each including a ground speed coordinate and an engine speed coordinate. The plurality of maps may also be specific to a present gear or gear range of machine 10. In FIG. 2, an engine speed limit vs. ground speed map for low gear(s) and high load is shown at 124. An engine speed limit vs. ground speed map for low gear(s) and low load is shown at 122. An engine speed limit vs. ground speed map for high gear(s) and low load is shown at 120, and an engine speed limit vs. ground speed map for high gear(s) and high load is shown at 118. During normal or full performance operation engine speed limits can be determined from one or more normal or full performance operation map(s) (not shown), typically providing whatever engine speed is called for by a given operator input. In FIG. 2a, a plurality of switches 126, 128, 130 and 132 are shown that receive either of a normal engine speed limit, Norm. Eng. Spd., or an economy engine speed limit, Econ. Eng. Spd., determined from a corresponding one of maps 118, 120, 122, 124. Any number of maps corresponding to any number of load factor values and/or any number of gears or gear ranges might be used. When an economy mode ON signal is produced or ON state is present, for example, switches 126, 128, 130, 132 may be structured to provide the Econ. Eng. Spd. limits. An economy mode OFF signal or OFF state, or the absence of an ON signal, for instance, could revert the switch arrangement back to normal so that the Norm. Eng. Spd. limits are provided. Gain calculations 134 and 136 are provided to modify engine speed limits according to specific present operating conditions. For instance, a gain might be applied where reducing engine speed too much would cause engine lugging, such as where a machine is digging a pile of material or starting up an incline. The determined engine speed limits are processed in a block 140 to determine an engine speed command 150 by comparison with operator requested engine speed 115 as described herein.

Figure 2B:
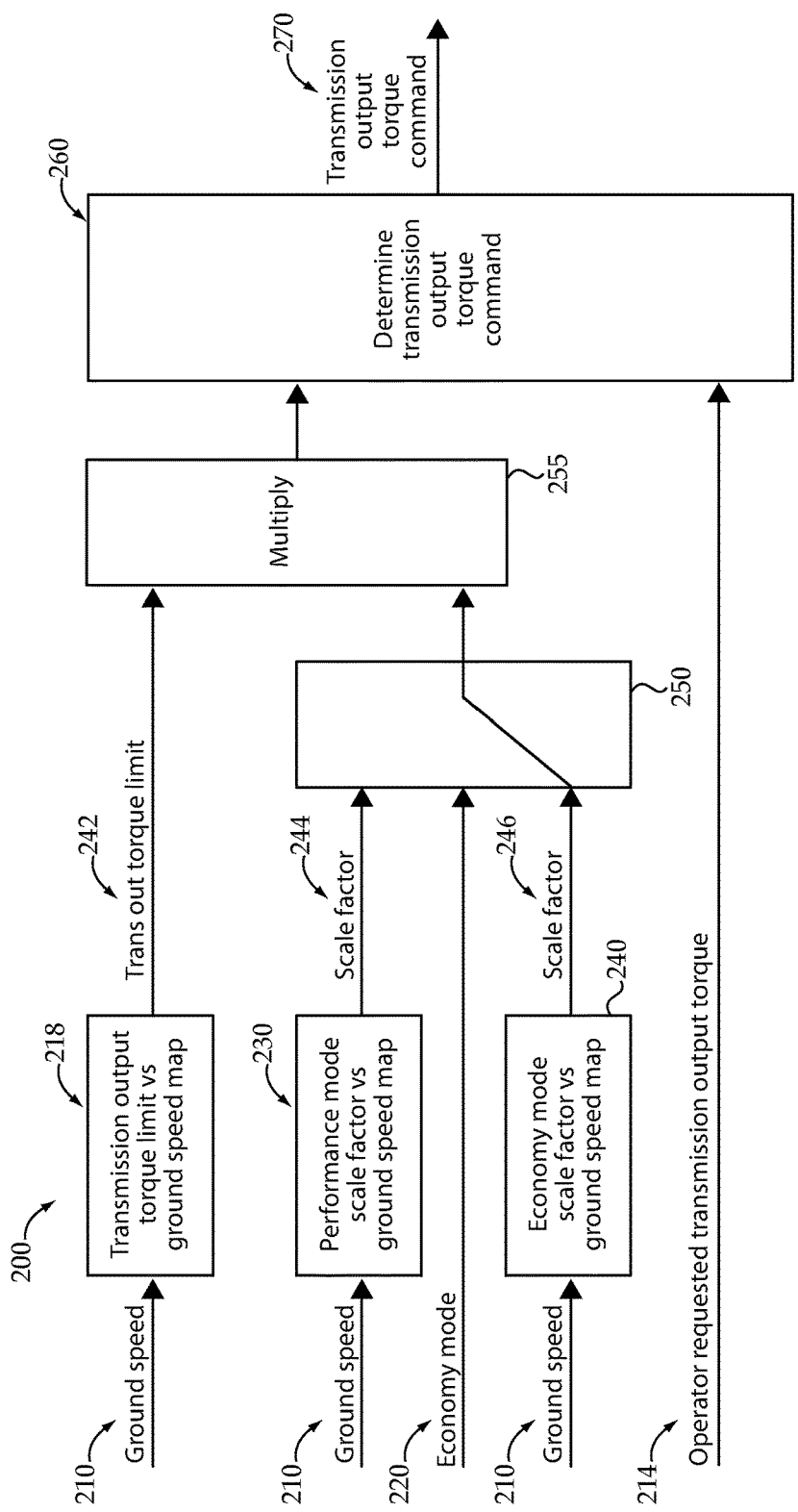
FIG. 2b is another functional block diagram of control system features and functions, according to one embodiment.

Referring to FIG. 2b, there is shown a functional block diagram 200 for determining a transmission output torque command 270. According to diagram 200, a ground speed input 210 is provided to a transmission output torque limit vs. ground speed map 218 to produce a transmission output torque limit 242. Map 218 may include, for instance, a ground speed coordinate and a torque limit coordinate. An economy mode signal or state is shown at 220, such as an economy mode ON signal. A performance mode scale factor vs. ground speed map is shown at 230 and receives a ground speed signal 210 to produce a scale factor 242. An economy mode scale factor vs. ground speed map is shown at 240 and also receives a ground speed signal 210 to produce a scale factor 246. An operator requested transmission output torque is shown at 214.

In diagram 200, a switch 250 is shown that has a state that varies in response to the economy mode input 220. When economy mode is on scale factor 246 is used in determining the transmission output torque command, and when economy mode is off scale factor 244 may be used. At block 255 the determined scale factor is multiplied by torque limit 242. A transmission output torque command 270 is determined in block 260. As can be seen from diagram 200, the scale factor is mapped to ground speed. Using a scale factor to determine the transmission torque command can allow engine 22 to be controlled according to a single lug curve. The varying of the scale factor with respect to ground speed may be non-uniform, and may vary between a higher value for a lower ground speed and a lower value for a higher ground speed in at least some instances. The higher value may be equal to about 1.0.

Figure 4:
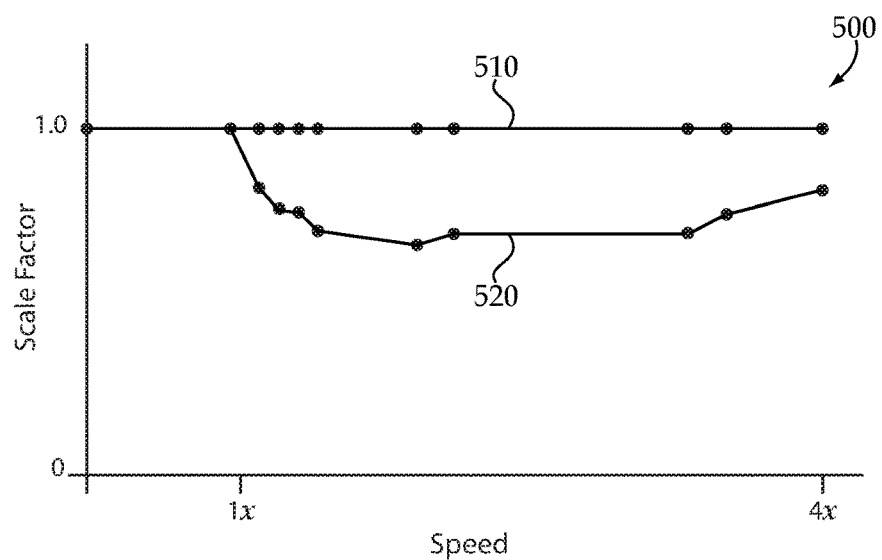
FIG. 4 is a graph of transmission torque scale factor versus machine speed, according to one embodiment.

Maps 230 and 240 can thus provide a value of the scale factor that is dependent upon ground speed. For normal or full performance operation, the commanded transmission torque may be substantially what the operator is requesting by way of the requested output torque 214. The scale factor value of 1.0 can be applied to such situations. Accordingly, in some instances control system 50 can be designed such that the map 230 always returns a scale factor of 1.0, although the present disclosure is not thereby limited. For part of economy mode operation, such as at lower ground speeds, the scale factor applied can be 1.0 in some instances, and less than 1.0 in other instances. Referring also now to FIG. 4, there is shown scale factor versus machine speed or ground speed in a graph 500. For normal or full performance mode, shown via line 510, the scale factor applied is always 1.0 irrespective of ground speed. In economy mode, shown via line 520, scale factor may be 1.0 for a lower range of ground speeds but can then vary for higher ground speeds. It can be seen that the varying of the scale factor is non-uniform, and will be higher for at least certain lower ground speeds and lower for at least certain higher ground speeds. The non-uniformity in the varying of the scale factor reflects empirical observations as to the manner in which the scale factor should vary relative to a requested transmission torque, in furtherance of such considerations as operator comfort, machine gear ratios, and still other factors. At the lower ground speeds, it has been discovered that a scale factor of 1.0 is appropriate in at least certain instances, such as where machine 10 includes a wheel loader that is regularly stopping, starting, reversing, increasing load factor, decreasing load factor, and generally operates at relatively lower speeds throughout much of its duty cycle. It can be undesirable to limit the transmission output torque in such instances from what the operator is requesting, however, for different machines or different machine duty cycles an entirely different scale factor to ground speed relationship might be appropriate.

Figure 3:
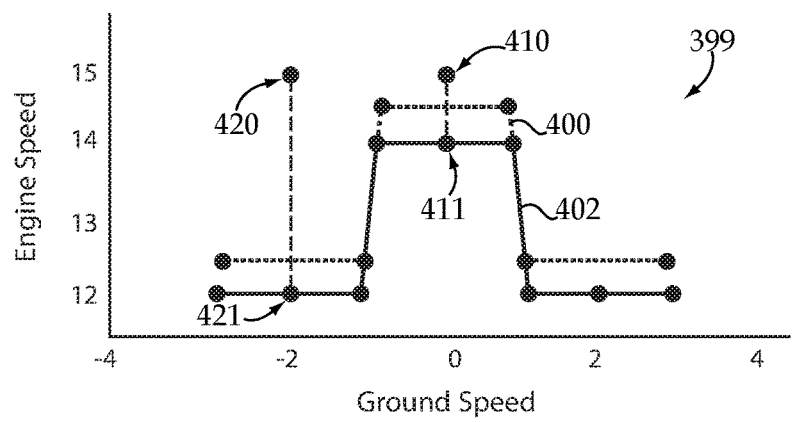
FIG. 3 includes a graph of ground speed versus engine speed for different operating states of a machine, according to one embodiment.

Referring now also to FIG. 3 there is shown a graph 399 relating engine speed to ground speed for economy mode in two different machine states. In graph 399 a first line 400 illustrates example engine speed limits that might be applied for a lower gear and higher load operation, whereas a second line 402 illustrates example engine speed limits that might be applied for lower gear and lower load operation. Lines 400 and 402 have the same shape in the illustration. The shapes are exemplary only, however, and in other instances could have different shapes than those shown and the shapes could be different from one another. For illustrative purposes, however, it can be noted that the allowed engine speeds for higher load operation are higher than for lower load operation. It can also be seen that the engine speed limits vary with changes in ground speed in either case. At relatively slow forward or reverse ground speeds allowed engine speeds are relatively higher. At relatively faster forward or reverse ground speeds allowed engine speeds are relatively lower. As further empirical observations are made about when and under what conditions engine speed should be permitted to rise or should be limited, different idealized and optimized shapes to curves defined by the engine speed limits can be expected to be developed.

Also shown in graph 399 is an example operated requested engine speed 410 and a corresponding example commanded engine speed 411. An example requested engine speed 420 is also shown with a corresponding example commanded engine speed 421. For these examples it can be assumed that the machine is operating according to engine speed limits defining line 402, in other words lower gear and lower load. As can be expected, in each example it can be seen that the commanded engine speed is less than the operator requested engine speed. It can also be seen that a relative difference between the operator requested engine speed and the commanded engine speed is different between the two examples. It can also be noted that were the machine operating at a different load factor when the operator requested engine speeds 410 and 420 are received, the extent to which the commanded engine speed differs from the operator requested engine speed would be reduced to different relative extents. In view of the graph of FIG. 3 it will be appreciated that the difference between requested powertrain output and commanded powertrain output can vary to an extent that depends upon the combination of ground speed and engine load at any given time.

INDUSTRIAL APPLICABILITY

Figure 5:
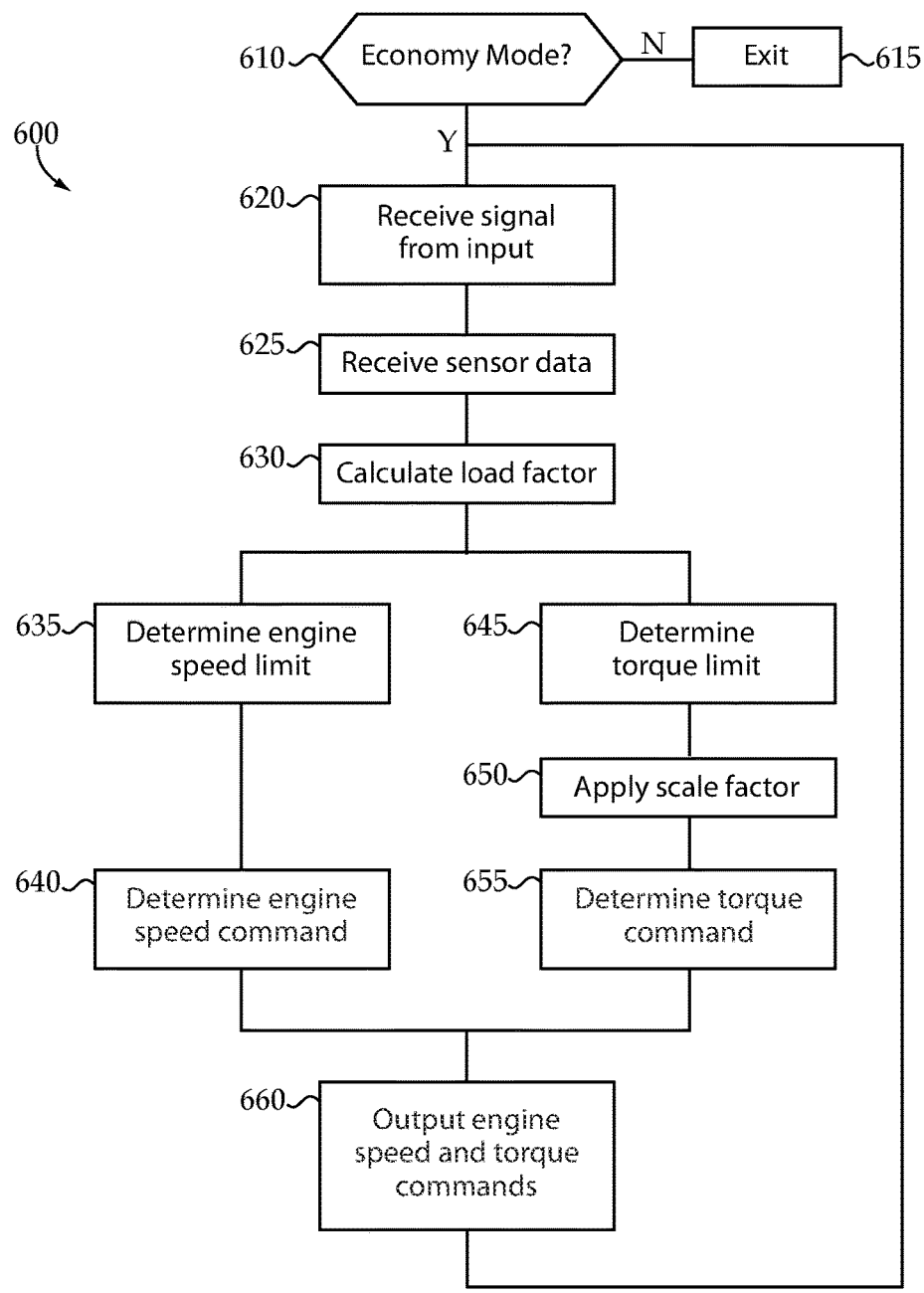
FIG. 5 is a flowchart illustrating control logic flow, according to one embodiment.

Referring also now to FIG. 5, there is shown a flowchart 600 illustrating example control logic flow according to the present disclosure. At block 610, the logic may query whether the machine is operating in economy mode. If no, the logic may exit at block 615. If yes, the logic may advance to block 620 to receive a signal from an input device, such as an operator input signal indicative of a requested powertrain output as described herein. From block 620 the logic may advance to block 625 to receive sensor data, such as ground speed sensor data and engine load sensor data.

From block 625 the logic may advance in parallel to blocks 635 and 645. At block 635 the logic may determine an engine speed limit, corresponding to ground speed and engine load as described herein. From block 635 the logic may advance to block 640 to determine an engine speed command. At block 645 the logic may determine a torque limit, such as a torque limit mapped to present ground speed. From block 645 the logic may advance to block 650 to apply the scale factor, and thenceforth to block 655 to determine a torque command. From blocks 640 and 655 the logic may advance to block 660 to output the engine speed command and the torque command. From block 660 the logic may loop back to execute again, or exit.

Each time the example logic depicted in FIG. 5 executes, machine 10 may be operating according to a present combination of ground speed and engine load, with the resulting commanded engine speed and transmission torque causing powertrain 20 to operate at an economy output that is reduced from a requested powertrain output. A first time that the logic executes, machine 10 might be operating according to a first combination of ground speed and engine load, and a second time that the logic executes machine 10 may be operating according to a second combination of ground speed and engine load. The first combination might yield a commanded powertrain output that results in operating powertrain 20 at a first economy output, whereas the second combination of ground speed and engine load might yield a commanded powertrain output that results in operating powertrain 20 at a second economy output. In certain circumstances, the first economy output may be reduced from the corresponding requested output to a relatively greater extent, and the second economy output may be reduced from the corresponding requested output to a relatively lesser extent.

The first combination of ground speed and engine load might be a lower load and a higher ground speed, and the operator might be requesting a full powertrain output at that time. The second combination of ground speed and engine load might be a higher load and a lower ground speed, with the operator requesting a full powertrain output at that time. According to principles discussed herein, the relative difference between what output is requested and what output is provided when operating according to the first combination may be relatively large, hence the relatively greater extent of reduction since the operator is requesting much more than what is allowed for a current machine operating state. When operating according to the second combination the relative difference between what output is requested and what output is provided may be relatively small, hence the relatively lesser extent of reduction since the operator is requesting closer to what is allowed at the current machine operating state. The transmission torque commanded in response to the first input signal may include a first transmission torque, and the transmission torque commanded in response to the second input signal may include a second transmission torque that is different from the first transmission torque. Given the different ground speeds in the two different instances, the first transmission torque may be determined by applying a first scale factor, and the second transmission torque may be determined by applying a second scale factor. Other combinations of ground speed and engine load could of course be expected to yield different results.

From the foregoing description it will be appreciated that engine speed and transmission torque can be limited to reduce fuel consumption. Rather than simply reducing an allowed engine speed a fixed percentage from a requested engine speed, limiting engine torque, or otherwise attempting a one-size fits all solution, the present disclosure provides for modulation of the limits on engine speed and modulation of the limits on transmission torque in a manner that can be expected to provide advantages over known designs lacking such flexibility. The present concepts are also tunable to different machine types and different machine applications. Flexibility in the selection of machine state(s) and the extent to which engine speed limits and transmission output torque limits are allowed to vary are also expected to present opportunities for economy in fuel burn that are not available with strategies where one-size fits all approaches are applied, at least not without tradeoffs in the nature of reduced performance.

The present description is for illustrative purposes only, and should not be construed to narrow the breadth of the present disclosure in any way. Thus, those skilled in the art will appreciate that various modifications might be made to the presently disclosed embodiments without departing from the full and fair scope of the present disclosure. Other aspects, features and advantages will be apparent upon an examination of the attached drawings and appended claims.

What is claimed is:

1. A control system for a powertrain in a machine comprising:
    a first sensing mechanism structured to monitor a ground speed of the machine;
    a second sensing mechanism structured to monitor an engine load of an engine in the powertrain;
    an input device structured to produce an operator input signal indicative of a requested powertrain output; and
    an electronic control unit structured to output an engine speed command for an engine in the powertrain and a torque command for a torque control mechanism of a variable-torque transmission in the powertrain, wherein the electronic control unit is in communication with each of the first sensing mechanism, the second sensing mechanism, and the operator input device, and is structured to determine each of the engine speed command and the torque command based on at least one of the ground speed and the engine load, to produce an economy powertrain output less than the requested powertrain output.

2. The control system of claim 1 wherein the electronic control unit is structured to determine an engine speed limit that is dependent upon the ground speed, and to determine the engine speed command based upon the engine speed limit in a fuel economy mode.

3. The control system of claim 2 wherein the electronic control unit is further structured to determine another engine speed command to produce a performance powertrain output in a performance mode.

4. The control system of claim 2 wherein the electronic control unit is further structured to determine a plurality of different engine speed limits that are based upon ground speed and engine load.

5. The control system of claim 4 wherein the electronic control unit is further structured to determine the plurality of different engine speed limits from a plurality of different stored maps, each of the plurality of different stored maps including a ground speed coordinate and an engine speed coordinate.

6. The control system of claim 5 wherein the electronic control unit is further structured to determine the engine speed limit from one of the plurality of different stored maps and to select the one of the plurality of different stored maps based upon the engine load and a present transmission gear or gear range in the machine.

7. The control system of claim 1 wherein the electronic control unit is structured to determine the torque command according to a torque limit and a scale factor that varies with ground speed.

8. The control system of claim 7 wherein the varying of the scale factor is non-uniform with respect to ground speed.

9. The control system of claim 7 wherein the scale factor has a higher value at a lower ground speed, and a lower value at a higher ground speed.

10. The control system of claim 9 wherein the higher value is equal to about 1.

* * * * *